United States Patent
Dawson

(10) Patent No.: US 7,319,469 B2
(45) Date of Patent: Jan. 15, 2008

(54) COPY PROTECTION ARRANGEMENT

(75) Inventor: Thomas Patrick Dawson, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 644 days.

(21) Appl. No.: 10/898,757

(22) Filed: Jul. 26, 2004

(65) Prior Publication Data

US 2006/0017747 A1    Jan. 26, 2006

(51) Int. Cl.
*G06T 13/00* (2006.01)
(52) U.S. Cl. .................................... 345/629
(58) Field of Classification Search ............... 345/629
See application file for complete search history.

(56) References Cited

U.S. PATENT DOCUMENTS

| | | | |
|---|---|---|---|
| 5,719,937 A | 2/1998 | Warren et al. | |
| 5,963,909 A | 10/1999 | Warren et al. | |
| 6,104,812 A | 8/2000 | Koltai et al. | |
| 6,510,234 B1 | 1/2003 | Cox et al. | |
| 6,701,062 B1 | 3/2004 | Talstra et al. | |
| 2002/0196370 A1 | 12/2002 | Dagtas et al. | |
| 2003/0216824 A1 | 11/2003 | Chu et al. | |
| 2003/0222994 A1 | 12/2003 | Dawson | |

*Primary Examiner*—Almis R. Jankus
(74) *Attorney, Agent, or Firm*—Miller Patent Services; Jerry A. Miller

(57) ABSTRACT

A video apparatus consistent with certain embodiments has a receiver that receives a data stream containing video data and video overlay data, wherein the video data includes a censored region having boundaries. A video plane receives the video data in order to render a video frame for display, the video data including the censored region. A video overlay plane receives the video overlay data in order to render a frame of overlay video data for display. The overlay data has boundaries that overlay the censored region. An alpha plane defines overlay boundaries for the overlay data to determine how much of the overlay video data overlays the censored region when rendering the video frame. The alpha plane defines boundaries that are smaller than the boundaries of the overlay data and larger than the boundaries of the censored region. This abstract is not to be considered limiting, since other embodiments may deviate from the features described in this abstract.

28 Claims, 9 Drawing Sheets

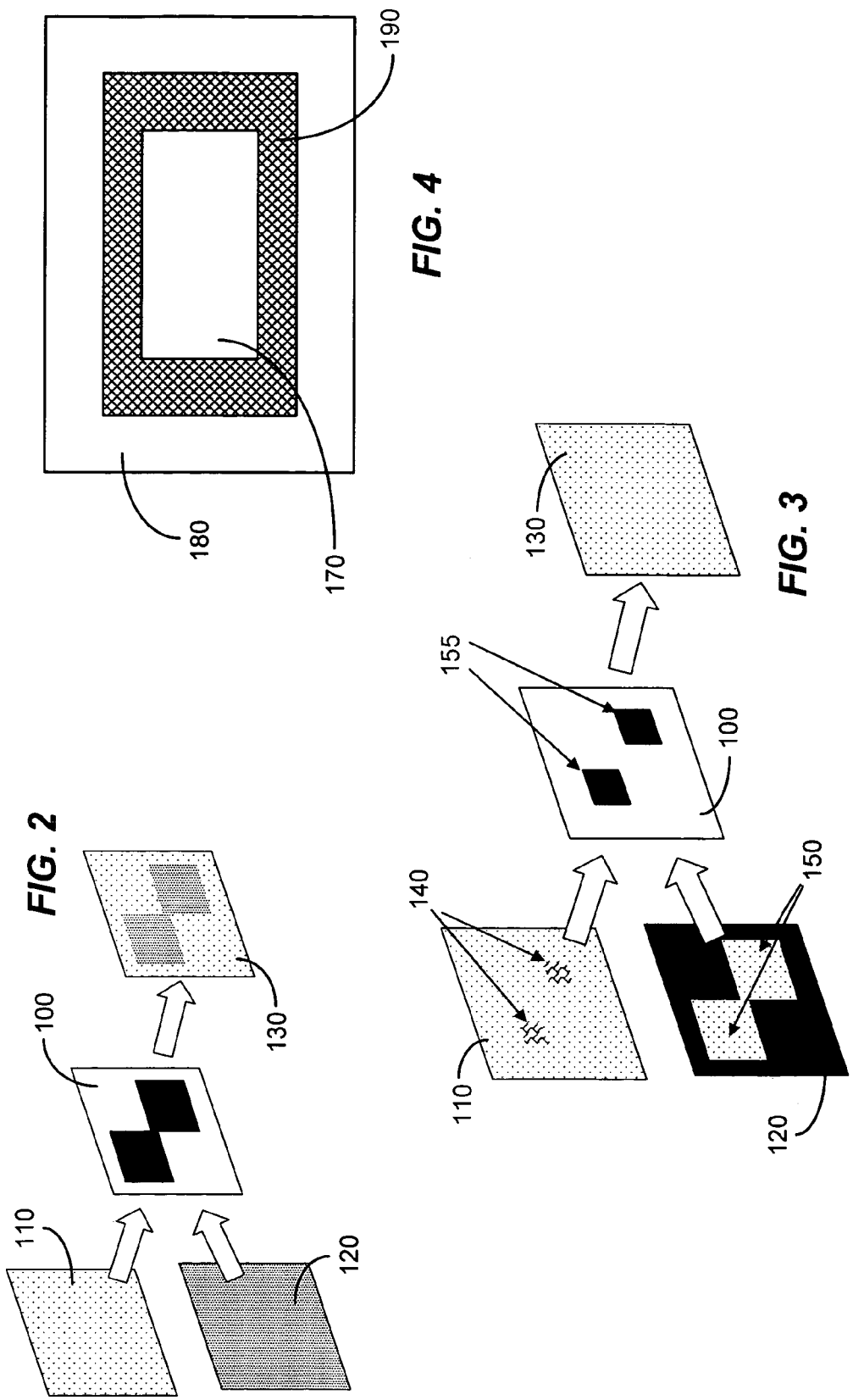

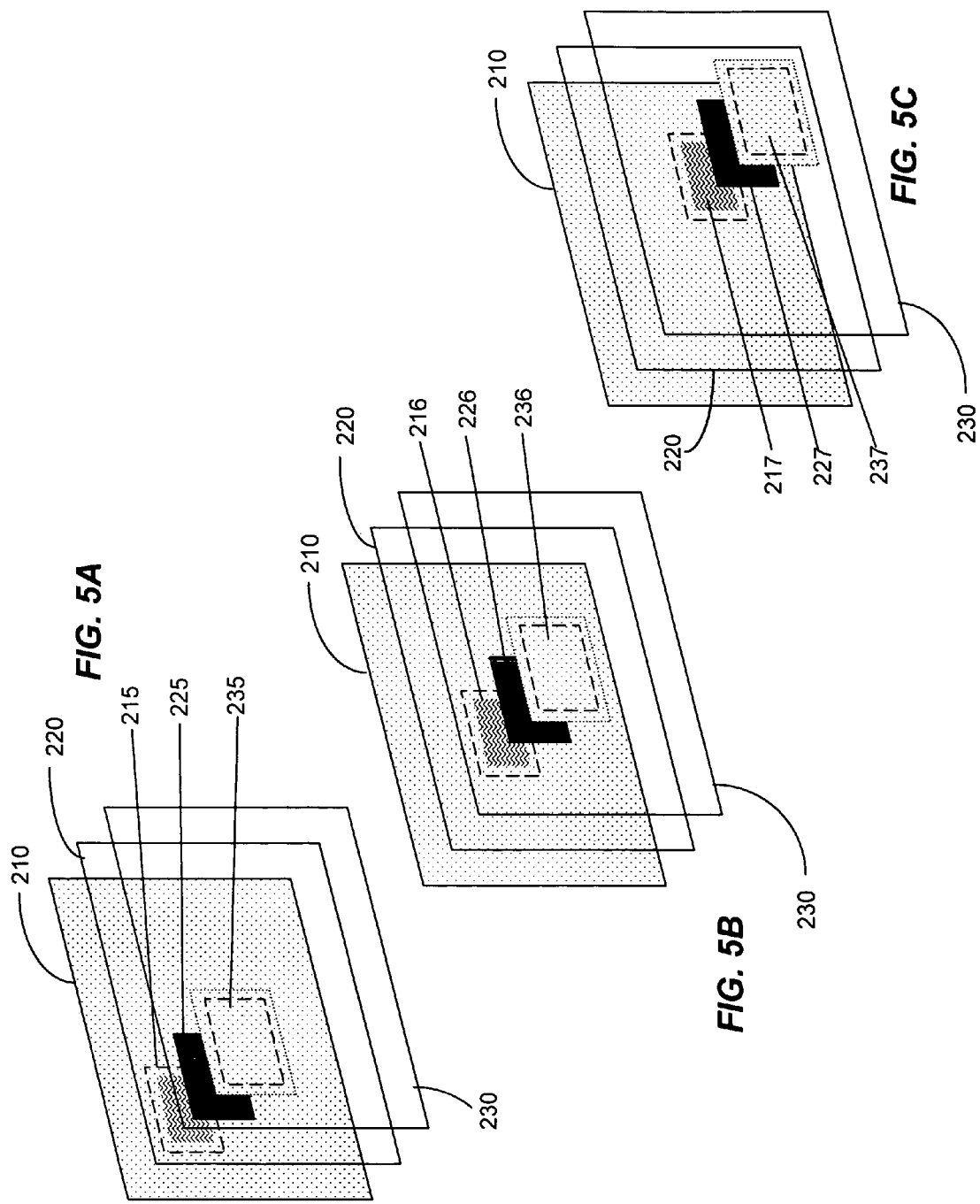

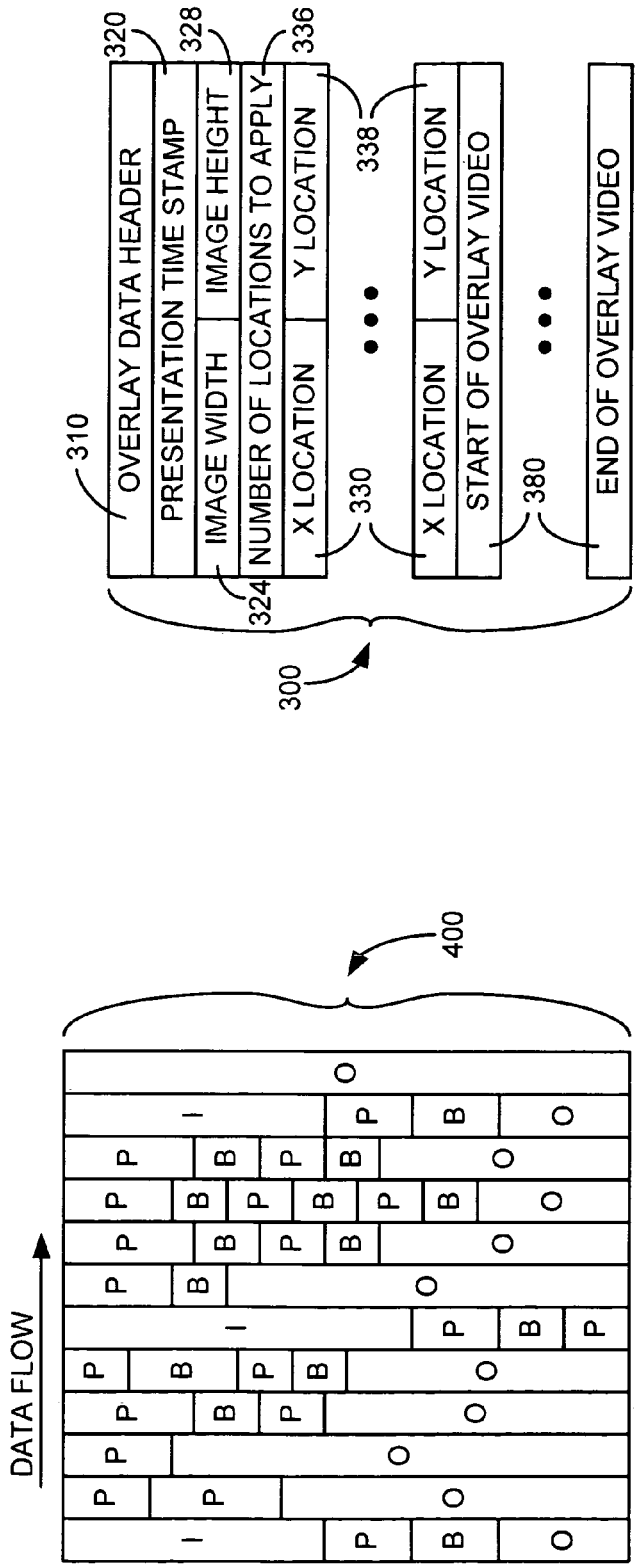
FIG. 6
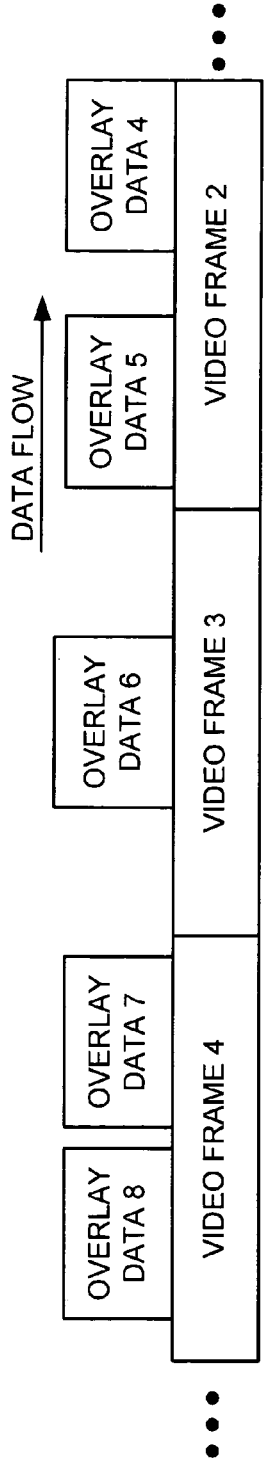
FIG. 9
FIG. 8

COPY PROTECTION ARRANGEMENT

CROSS REFERENCE TO RELATED DOCUMENTS

This application is related to pending U.S. patent application Ser. No. 10/156,907, filed May 28, 2002 which is hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Content providers such as broadcasters often provide special feature presentations such as sports events, live concerts and first time showings in addition to normal content that they do not want copied by the consumer. It is the exclusive availability of this material that, in part, gives it additional value. Hence, broadcaster can often charge advertisers more for on-air commercial time during these special events.

Currently, broadcasters have no significant control over their content, whether a special presentation or normal content, other than a stem warning about the legal penalties for making copies or re-broadcasting without permission. The use of watermarking or placing a logo in one corner has proven to be of little value in limiting the copying of this type of material.

This situation has led to content being encrypted and sent to the user's equipment where it is decrypted for display; however the analog output on consumer devices presents a problem. The analog output then needs a copy protection scheme applied such as that provided by Macrovision Corporation. The shortcoming of this approach is that Macrovision Corporation's copy protection is easily overcome with a time base corrector.

An issue that results from this is the illicit hacking of the encryption scheme. There have been cases where the encryption scheme for satellite service was compromised for a short period of time.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 2 is a view of a video plane and an overlay video plane and an alpha video plane consistent with certain embodiments of the present invention.

FIG. 3 is a view of another video plane and an overlay video plane and an alpha video plane consistent with certain embodiments of the present invention.

FIG. 4 is a view illustrating the dual guard banding in a manner consistent with certain embodiments of the present invention.

FIG. 5, made up of FIGS. 5A, 5B and 5C, are views of the overlay content dynamically moving across the video overlay plane thereby restoring the entire video consistent with certain embodiments of the present invention.

FIG. 6 is a view of frame information for synchronizing of the video overlay content with the video plane consistent with certain embodiments of the present invention.

FIG. 7 is a view of an example video plane and an overlay video plane having multiple areas of video overlay consistent with certain embodiments of the present invention.

FIG. 8 illustrates one method for transmission of overlay data consistent with certain embodiments of the present invention.

DETAILED DESCRIPTION

Figure 1:
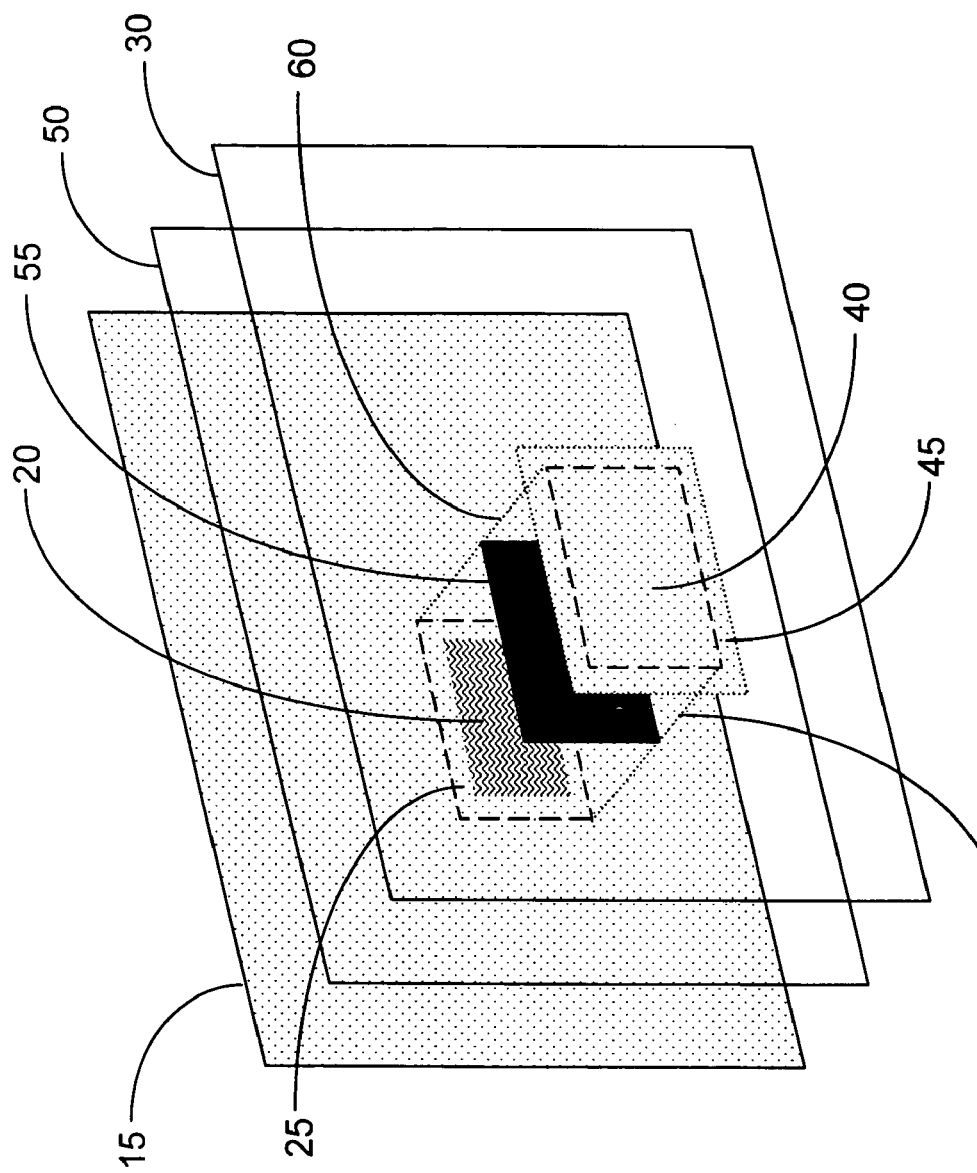
FIG. 1 is a view of a video plane and an overlay video plane consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are often used to describe the same, similar or corresponding parts in the several views of the drawings.

Definitions

The following definitions are set forth and are intended to be used when reviewing the matter contained in the below description and shown in the accompanying drawings to be interpreted as illustrative and not in a limiting sense.

Video—a digital video signal provided from content providers, including but not limited to terrestrial broadcasters, cable companies, satellite providers and pay per view providers.

Video Channel—a designated frequency, time slot, etc. for carrying modulated video content in a manner that segregates it from other channels using, for example, multiplexing technology.

Video plane—internal hardware device including memory that is used for the scan out to a display.

Overlay plane—a video plane used for overlaying one plane of video over another plane of video on another video plane.

Overlay video plane—overlay plane.

Alpha Plane—an internal hardware device including memory that is scanned out during display to determine that a pixel (e.g., displayed video) of video comes from a specified video plane. This term is used in the same sense as the term is used in video compositing.

Guard band—a section of video adjacent a cutout segment of video that encapsulates artifacts from a cut edge of the video—an over-rendering of the video near a cut edge to isolate any artifacts that result from the cut.

Overlay content—the package of information sent from the content provider that specifies data to be overlaid on the displayed video using the overlay plane.

Video content—video information intended for display on a display device.

Video overlay—a video plane used to overlay video on another video plane for display on the video for display.

Video plane information—the current content data of the video display plane.

Meta-data—a collection of information that encompasses data transmitted with the video signal. The Meta-data contains information about the overlay video signal and is transmitted separately from the video sent by the content provider. In an exemplary embodiment the Meta-data will be transmitted in the user data section of a MPEG transport stream.

Video signal—the MPEG 2 video data sent from the content provider.

Overlay data—data that describes the image to overlay the video.

Frame synchronizing data—the portion of the overlay content that specifies which frame or frames of the video the overlay data is to be supplied too.

Overlay information—same as Overlay content.

Random—this term should be interpreted to encompass random, pseudo-random and quasi-random.

Displayed video—the visual output of a particular video channel.

Interrupt signal—the signal sent to the CPU specifying frame or frames received from a tuner or other front end device.

PVR—Personal Video Recorder—same as a digital video recorder—a device that records digital video such as MPEG video and generally stores the video using disc drive technology.

Marred area—a region of display content that is distorted, filled with random colors, filled with a pattern of colors, blacked out or otherwise disfigured. For purposes of the present discussion, a "censored area", a "distorted area" and a "marred area" are construed to mean the same thing.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/ dynamic load library and/or other sequence of instructions designed for execution on a computer system.

The term "distorted" is to be interpreted to mean any removal, changing, marring or censoring of information in a video plane that modifies it from its original or intended content for purposes of obscuring or censoring the content. This includes removal of information. The terms "censored" and "marred" are used synonymously with distorted.

DESCRIPTION

As previously noted, an issue that results from certain existing schemes is the illicit hacking of the encryption scheme. There have been cases where the encryption scheme for satellite service was compromised for a short period of time. The overlay data described in conjunction with embodiments consistent with the present invention can have independent encryption applied. Thus, these embodiments provide a mechanism to protect content from illegal copying that prevents useable copies being made from the analog output ports on consumer device and is resistant to compromise of the encryption system for content delivery. That is, these embodiments consistent with the present invention provide an additional layer of protection that is built into the content that is encrypted and delivered to the user's equipment for display. Thus, breaking only the content delivery encryption will not produce a copy of the video content that is useable for resale or rebroadcast.

In accordance with certain embodiments consistent with the present invention a video image is completed by overlaying a first video plane having data missing or distorted with a second video plane which replaces the missing or distorted video information. The two video planes are synchronized by use of synchronizing data.

In accordance with certain embodiments consistent with the present invention, a mechanism allows protected digital video content to be viewed by a consumer in 'pristine' form from an original broadcast or from PVR playback while only a marred version may be recorded to VCR tape or DVD. Viewing of a correct copy of the protected digital video is restricted to viewing during broadcast or during play back via internal (or possibly by appropriately enabled external) PVR drive. An attempt to record protected material to a VCR or DVD will result in storage of a marred version of the content. An attempt to intercept protected content "outside an authorized system" will result in recording marred content. Unprotected content is not affected and can be recorded to a VCR or DVD system.

Embodiments consistent with the present invention provide content providers of digital video with the mechanism to allow a consumer to view digital content and store it on a PVR type system while at the same time only allowing a marred version to be copied to a VCR or DVD recorder. This allows direct control of digital rights management (DRM) by the content provider and can be used in addition to current encryption technology. Certain embodiments do not require changes to the existing MPEG standard and is compatible with the hardware that currently exists in digital television set-top boxes and digital television sets.

The above-referenced patent application provides a mechanism of displaying image data in a graphics overlay plane that is synchronized to the displayed video. In accordance with certain embodiments consistent with the present invention a second video plane is used instead of a graphics overlay plane. The material shown in the second video plane acts as an overlay, thus the first video plane will "show through" areas of the second video plane, as shown in FIG.

1. A separate graphics overlay plane (not shown) provides for the On Screen Display (OSD) for menus and control selections.

Referring to FIG. 1, a video plane together with an overlay video plane and overlay content is depicted, indicated generally at 10. Video plane 15 is used in tandem with video overlay plane 30 and alpha plane 50 to produce a completed video frame. The position of a censored portion 20 of the video plane plus a guard band region 25 is the same as the portion shown on the video overlay plane 40 plus a guard band 45 in the overlay plane. The censored portion 20 is marred or otherwise changed, distorted or blacked out in video plane 15. The guard band region 25 prevents the censored portion from affecting pixels not covered by the video overlay region 40 of video plane 30. An alpha plane mask 55 acts to composite video plane 15 with video plane 30. Lines 60 and 65 are simply provided to indicate the alignment between the alpha plane mask 55 with video plane 15 and overlay video plane 30. Since most types of digital video are compressed using a lossy encoding (e.g., MPEG) adjoining pixels can affect each other. Thus, simply cutting out a section of video does not work due to the effect on adjacent pixels in the area on both the first video plane 15 and the overlay video plane 30. A dual guard banding technique is used in connection with certain embodiments consistent with the present invention as will be described in detail later.

In order to use the present embodiment, the device used to render the output video should have at least two video planes and preferably more. This is commonly the case with digital television receiver devices which may have several such video planes available for use. The multiple video planes are normally used, for example, for picture in picture functions, side by side video and streaming video display from the Internet.

In the embodiment shown, the censored portion 20 of the video plane 15 may be overlaid with the appropriate content appearing at region 40 in the video overlay plane 30 as masked by alpha plane 50. The remainder of the video overlay plane 30 is not used so that the composite uncensored image is made up from the video rendering in the first video plane 15 less regions 20 and 25, plus an overlay portion 40 of the overlay plane (less guard band 45 in the overlay plane). The viewer can thus perceive a complete uncensored video image.

To create the overlay effect between the two video planes a mechanism for specifying transparent pixels in the second video plane is used to allow the pixels in the first video plane to be seen. There are many ways to accomplish this depending on the features provided by the specific implementation. In one exemplary embodiment depicted in FIG. 2, a separate alpha plane 100 is used to indicate whether the output pixels come from the first video plane 110 or the second video plane 120. The contents of the alpha plane 100 are used as a mechanism of indicating which output pixels come from the first video plane 110 and which comes from the second video plane 120 (video plane 120 serves as an overlay video plane to produce the displayed video). When the information from the first video plane 110 is merged with information from the second video overlay plane 120, the resultant output image is shown as 130.

When playing back the data in the overlay video plane 120 the playback is synchronized to be a frame-for-frame match with the first video plane 110. Because MPEG (and similar predictive coding techniques) is a lossy format and neighboring pixels may affect the encoding a double guard band technique is employed to prevent encoding artifacts from having an effect on the displayed pixels.

With reference to FIGS. 3 and 4, the marred areas 140 in the first video plane 110 is kept smaller than the size of the overlay areas 150 in the second video plane 120 serving as an overlay plane. Overlay areas 150 are used to cover regions 140 in the overlay video plane 120. During encoding, since the marred areas may affect adjacent pixels in the video plane 110 and create visible video artifacts, a larger area is used to cover up the marred area in the video plane 110 to prevent these encoding artifacts from being seen. This marred area 140 plus a first guard band in the video plane 110 are covered up by selected portions 150 of the overlay plane 120. Similarly, the displayed area of the overlay video plane 120 is made smaller than the areas 150 that are actually rendered, since the rendered video in the overlay video plane will also contain artifacts adjacent the edges of the rendered video areas 150.

The second guard band is provided by creating a larger replacement area 155 in the overlay video plane than is actually shown in the composite video image. It is preferred in certain embodiments that the data size of the video for the overlay video plane 120 be as small as possible to conserve transmission bandwidth. Unused areas of the overlay video plane 120 can be set to a constant color such as black so that the MPEG-2 encoding process will generate a minimal amount of data for those areas. At the same time, it is undesirable for the black regions to disturb the display pixels in the same way that the marred content affects data in the video plane 110. To overcome this, a larger area than needed can be rendered in the overlay video plane 120 and only a sub-section of the rendered region is used by specifying smaller regions 155 in the alpha plane 100.

As illustrated in FIGS. 3 and 4, the alpha plane clips out a region from the overlay video plane 120 that is smaller than the rendered area while being larger than the marred area 140 in the video plane 110. Thus, the alpha plane 100 clips the guard band from both the image in the video plane 110 and the overlay video plane 120 to permit rendering of a composite image without the video artifacts resulting from the clipping. The areas in the alpha plane 100 are larger that the marred areas 140, and are smaller than the rendered areas 150 in the overlay video plane 120. By keeping them smaller than the rendered regions 150 in the overlay video plane 120, only the "good" region of the overlay video plane 120 are clipped out and do not show pixels with encoding artifacts along the edges of those areas.

Referring specifically to FIG. 4, the region 170 represents the marred area from the video plane 110. The entire area outlined by 180 represents the area rendered in the overlay video plane 120. The region 190 represents the size of the area taken from the overlay video plane 120 for the composite image that overlays the guard band from the video plane 110. Thus, as shown in FIG. 3, the alpha plane 100 clips the area in the overlay video plane 120 to match the size of the marred area 140 plus the guard band from the first video plane 110. The region with no cross-hatching shown between the outer perimeter of area 180 and the outer perimeter of area 190 represents the guard band of the overlay video plane 120 which does not form a part of the final composite image.

In certain embodiments, the present invention extracts blocks of pixels, such as (but not limited to) MPEG-2 macro blocks, from the broadcast video which are associated with motion vectors. These blocks of pixels are replaced in the actual video with either; all black, some solid color or a pixel pattern of some sort. The correct blocks of pixels are transmitted in a separate channel, for example, in the MPEG user data, for display in a synchronized manner in the overlay video plane 120. The extracted pixels transferred through the user data and shown in the overlay video plane 120 show the correct data to the consumer. The overlay video plane 120 acts as an overlay to the video plane 110. The correct data in the overlay video plane 120 covers up marred areas 130 in the video plane 110 to reconstruct a full image as shown in 130.

The signal recorded to a VCR or DVD recorder does not include the data in the second video plane 120. Therefore, the first video plane 110 contains a "marred" version of the video where selected areas of the image have been disfigured and only a marred version of the video can be recorded to a VCR or DVD recorder.

One technique to create the "marred" areas in the first video plane 110 is by having pixel blocks (such as MPEG-2 macro blocks) associated with motion vectors colored black, colored incorrectly, filled with a pattern or otherwise altered. Given that a significant number of marred areas can be generated within any scene, the marred video from the video plane 110 will be rendered useless for the purposes of piracy or public re-broadcast. It is noted that the marred areas and overlay areas shown in the figures may be exaggerated over those that might be actually used for purposes of clarity of explanation and illustration of the principles.

A PVR system can be enabled to store the entire digital signal, including the user data that supplies data for the overlay video plane 120, for later play back. During playback from the PVR hard drive, the user may enjoy the content but still cannot copy it to a VCR or DVD recorder without distortion.

The motion vectors associated with MPEG-2 macro blocks describe a situation where the same pixel data is simply translated to a new position on the display screen, as described by the MPEG standard. Since the data within the macro block is static it will be transmitted once and shown in the overlay video plane 120 at a series of positions as described by the MPEG standard. Since the data for the overlay video was extracted from the underlying video data the overlay video will be synchronized with the underlying video display. Also, since the extracted data describes motion vector data the resulting MPEG video data for the overlay video plane will have a very high compression factor. It is also possible to use the same marring within the vector motion data in the underlying video plane. Since the data remains static it will remain motion vector data and the video compression ratio is maintained.

As stated above, by extracting blocks of pixel data that are associated with motion vectors the overlay video will be highly compressed. This reduces the required bandwidth in the user data channel. Not all of the data placed in the overlay plane has to be associated with motion vectors. Selected regions not associated with motion vector data can also be extracted and placed in the overlay video. It is the bandwidth available in the user data channel of the digital video signal that controls the amount of data that can be sent.

In embodiments consistent with the present invention, this mechanism can be utilized to inhibit unauthorized duplication of content, as will be described later, or can be used as a censoring mechanism (e.g., for parental control of the content viewed by a child).

Referring next to FIGS. 5A-C, a positioning of the overlay content in the video overlay plane in accordance with certain embodiments consistent with the present invention is depicted. When using MPEG 2 video, for example and not by way of any limitation, the beginning and ending time for a series of frames are specified in terms of the presentation time stamp (PTS) of the frames. These presentation time stamps are typically present in every frame to ensure frame synchronization. The overlaying regions for the alpha plane content are specified by coordinates X, Y. The contents in the two video planes are automatically synchronized by location based on the fact that the overlay video is extracted from the underlying video plane. As is shown in FIG. 5A, video overlay content 235 located in the video overlay plane 230 is positioned over the marred content. The video frame shown in plane 210 and in plane 230 are displayed with a matching presentation time stamp of 1234567. The alpha plane mask 225 is sized and positioned to match the position of the marred area and hence the data in the video overlay plane, the presentation time stamp (PTS), size and position data (see FIG. 6) sent in the overlay packet data allows the alpha plane 220 to position the alpha plane mask 225 in the correct location for that frame of video.

Both video plane 210 and overlay video plane 230 have a presentation time stamp of 1234567 of its particular frame. Thus, the position of the alpha plane content is matched to the video frame in the video plane 210. This matching operation is performed by matching the presentation time stamp or other frame identifier information of the video frame with that of the video overlay plane. The video frames in each video plane may be an I frame, a B frame or a P frame for digital video. Each video plane may contain a different type of frame. For example, video plane 210 may hold an I frame while video overlay plane 230 holds a P frame.

Also, as noted in FIGS. 5B and 5C, further matching operations are shown in accordance with the invention. For example in FIG. 5B, video frame 2 having a presentation time stamp of 1234568 is matched with alpha plane mask 226 of the alpha plane 220 having a corresponding presentation time stamp of 1234568. Thus the video plane 210, overlay video plane 230 and the alpha plane 220 are all synchronized by bringing together the same presentation time stamps. In FIG. 5C, the video frame 3 having a presentation time stamp of 1234569 of the video plane 210 is matched to video overlay plane 230 and alpha plane 220. The PTS information sets alpha plane, mask 227 in the correct position to composite overlay video area 237 over the marred area 217. As a result, the video overlay plane overlays and dynamically tracks the censored portion of the video plane to create a perception of a complete video program. The alpha plane mask 225, 226, 227 tracks the movement of the censored portion of the video planes on an individual X and Y location basis to composite the video plane 210 and the overlay video plane 230 to render the final video images.

The above matching operation can be implemented in a number of ways. In one embodiment, an interrupt is generated from a video decoder signal to a microprocessor when a next frame of video is ready for displaying. Alpha plane content and overlay plane video content are initially decoded into a buffer or circular queue slightly ahead of the underlying video such that when the next frame is signaled as ready by an interrupt signal, the overlay video is ready for display on the overlay video plane and the alpha plane content is ready for display in the alpha plane. The interrupt signal sent from a video decoder either provides the frame timing information or is set up so that the information is readily available at a specified location. Having the overlay packet data arrive slightly ahead of time allows a period for the overlay packet to be decrypted prior to display.

Additionally, multiple distorted areas can be accommodated by specifying multiple X,Y locations for alpha plane masks for a particular frame. Each area of the video contents of the overlay video plane is matched with an alpha plane mask in the alpha plane at positions designated by different X, Y coordinates. Hence each of the above video areas has corresponding video overlay content matched with an alpha mask at a corresponding X, Y location. Therefore, multiple areas of overlay video content can be placed at different locations with one frame of video. The data being displayed can also vary with each frame. The video overlay images being overlaid are not required to be placed in a static position and can be track motion vector data from the MPEG video.

FIG. 6 shows an example of an embodiment of the present invention comprising the frame identifier information used in the current embodiment to specify the location over a series of video frames for synchronizing the video overlay content with the displayed video. The video overlay content information may be added in real time to a live presentation in progress. In certain embodiments consistent with the present invention, the alpha data is sent by itself along with a separate MPEG-2 video that hold the connects of the overlay plane, as illustrated in FIG. 6. The frame identifier information comprises an overlay ID and possibly other information in an overlay data header 310, a presentation time stamp 320, image width and height 324 and 328, a number of locations to apply the video overlay content 380, multiple X position 330, multiple Y position 338, and video data 380 (for example, MPEG I, B or P data) defining the video overlay data. The identifying information contains the necessary information for overlaying of video overlay content and audio by a properly equipped set top box "STB" or television. The video overlay, in this example, is MPEG data that can be an I, P or B frame.

The data header can be used to indicate the format of the video overlay data allowing for a number of different formats to be supported. The presentation time stamp indicates the video frame to apply the video overlay data to. In this example, MPEG I, P and B frame data can be used. Variations on the frame format could utilize other video formats than the exemplary MPEG format. Other embodiments will also occur to those skilled in the art upon consideration of the present teaching.

The size used for the marred areas should preferably, but not necessarily, be reasonably small to limit the overhead imposed by adding the current content protection, in accordance with certain embodiments. The performance of the video hardware needed to support the system should be adequate to support the present overlay function. These preferences should not be considered limiting, however.

The overlay data used for the overlay in the video overlay plane should be ready to display when the frame of associated video is about to be shown in the video plane. The video overlay data, both alpha plane data and MPEG overlay data, for a particular frame of video should therefore be delivered ahead of time to allow for any processing such as decryption, queuing and buffering for display.

The multiple entries for the image X and Y coordinates are included in the example data frame to demonstrate that the current embodiment allows several marred areas to be applied to a single frame of MPEG video. Other embodiments could use multiple X and Y entries to track the alpha mask location of a moving marred area over a series of frames. These techniques can be combined given a format that distinguished X an Y position data applied to a single frame and those applied across a series of frames.

The techniques described here may be combined and other methods may be envisioned as well to suite the needs of protecting copyrighted content. The current embodiment is designed to allow adaptation and innovation. The advent of downloadable system software updates allows expansion of the data formats to thwart any attempts to breach system security.

While the illustration shown in FIG. 1 suggests that a single large area of the image is to be distorted in accordance with embodiments consistent with the invention, no such limitation should be deduced. FIG. 7 illustrates that a video plane 384 can incorporate any number of distorted or censored segments 388 that are overlaid by corresponding overlay data 392 in overlay plane 396. In the current embodiment, the contents of the overlay video plane are just that, MPEG video data. One could actually play that MPEG overlay video data by itself and see the overlay segments alone. The alpha plane data composits the two video planes together.

For the current embodiment, the pixels shown in the video overlay plane arrive in a separate channel than the video data. For an MPEG-2 transport stream this side channel could be implemented using the MPEG user data channel.

One approach to managing the bandwidth for the overlay data takes advantage of the technique many broadcaster use of allocating a fixed bandwidth for each video channel. Currently, when the entire bandwidth is not used null packets are inserted to maintain the fixed bandwidth. Instead of null packets, this unused bandwidth can be used to carry overlay data, as depicted in FIG. 8, which depicts the concept of a channel 400 of fixed bandwidth. In this depiction, I, B and P represent MPEG I, B and P frames for the marred video. O represents overlay data that includes the alpha plane data and the overlay MPEG data. Any remaining bandwidth after MPEG data and overlay data can be filled with null packets as is normally done.

In another embodiment, the overlay data can be sent via any other suitable side channel, for example via an out of band modem channel. Other channels will also occur to those skilled in the art upon consideration of the present teachings.

Figure 9:
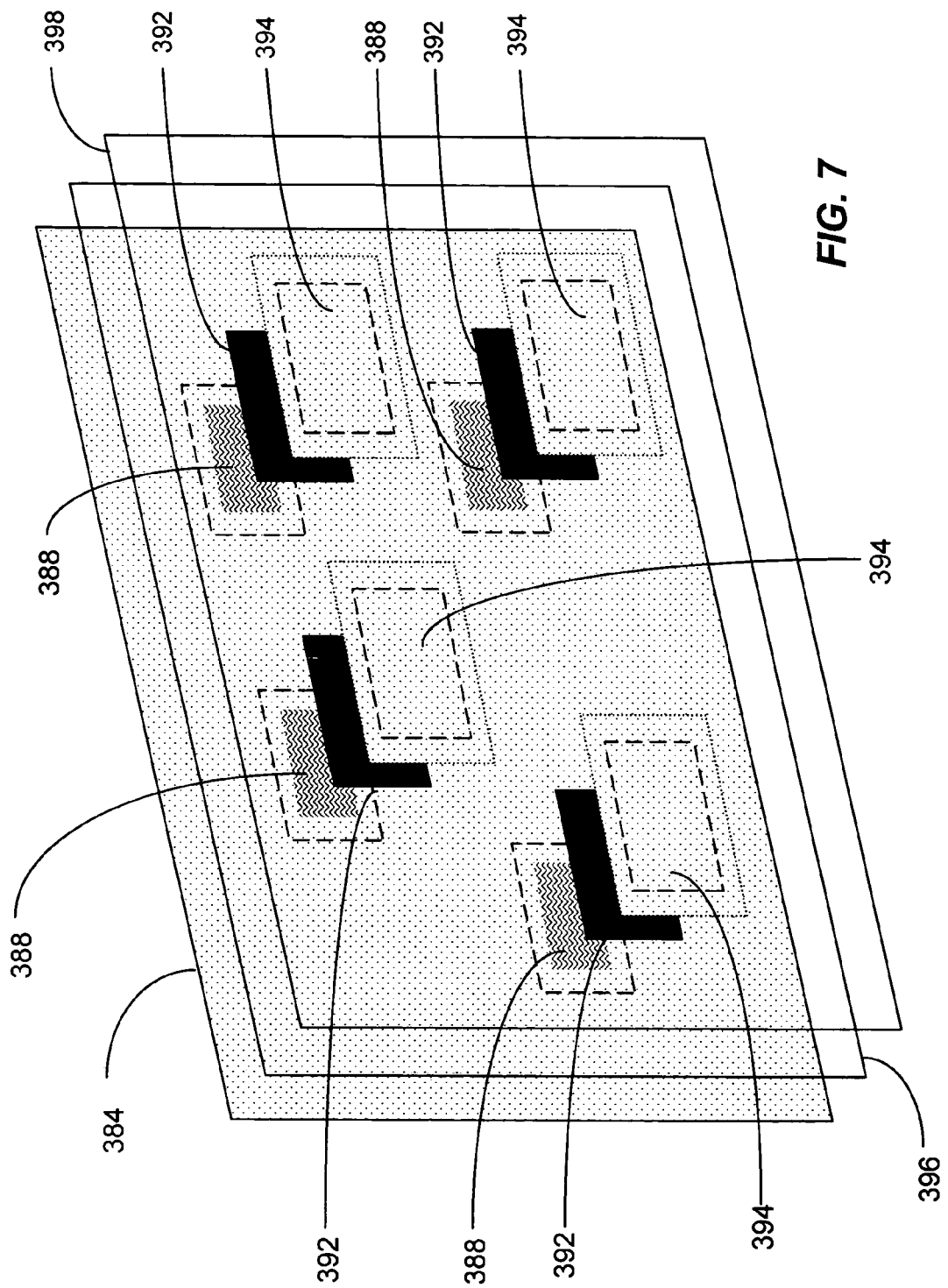
FIG. 9 illustrates the timing of arrival of overlay data consistent with certain embodiments of the present invention.

The video overlay plane data sent through the user data channel, or the entire user data channel may be encrypted, such that a decrypting mechanism for the encrypted data on the end user client side is used to decrypt the video overlay data. Given the time required to process the side channel data (the overlay data) relative to the video data, it should preferably be delivered in advance of the video data as shown in FIG. 9. Alternatively, the video can be buffered or stored for later display. The side channel data in this example arrives prior to the video data to allow time for decryption, image decoding and preparation for display. The arrival times are depicted by the numbers in the frame, for example, overlay data 4 represents data that overlays video frame 4. This diagram is meant to show that the overlay data are delivered prior to the frame of video it will be applied to. The amount of overlay data is dependent on the bandwidth available for the user data channel along with the type and level of compression used for the overlay pixel data.

The pre-delivery of the overlay data can be also seen in FIG. 8. Overlay data are delivered prior to the start of video data to ensure that the overlay information is ready for display with the corresponding frame of video. In addition, the data sent for the overlay may use some form of compression to lower the bandwidth needed for the overlay data.

In order to implement a system that uses embodiments consistent with the present methods, a device having multiple video planes is adapted to utilize at least one of the video planes to support the overlay data and additionally, an alpha plane is supported.

A signal that notifies the software controlling the overlay video plane of the vertical retrace interval synchronizes the contents of the overlay video plane with the video plane. The pixels of the overlay video plane replace the marred pixels embedded into the video in accordance with the alpha plane, producing the completed display. The video synchronization timing is used to place the correct overlay pixel data into the correct frame of video.

In order to provide for the copy protection features of embodiments consistent with the present invention, the output video supplied for VCR or DVD recording does not include the contents of the video overlay plane.

The separation of the video and video overlay data streams means the timing of the video overlay plane data relative to the video data should be taken into account. Both the time required for the video to be decoded for display and the time for the decryption and buffering of the video overlay data should be considered. If the video overlay plane data arrives too early it wastes buffer space on the client display holding pixel data for video that has not yet been displayed. If it arrives too late then the video overlay plane data will not be ready when the video is shown. For example, MPEG-2 P-frames or B-frames may be very small and will usually be decoded very quickly. Within certain embodiments consistent with the present invention, the delivery timing of the overlay data is not fixed and may vary anywhere from one to several frames in advance of the video frame data to ensure the overlay data is ready for display. If buffer memory is not a premium, many frames of advanced video overlay data can be delivered. Similarly, if extensive buffering is available, both video and overlay data can be buffered for later display.

Another factor to consider is the timing constraint of the vertical retrace interval. The video overlay plane is updated with the correct information for a given video frame within this interval. If there is more video overlay data than can be handled within the vertical retrace interval then the display will be incorrect and the marring of the underlying video could be revealed.

Figure 10:
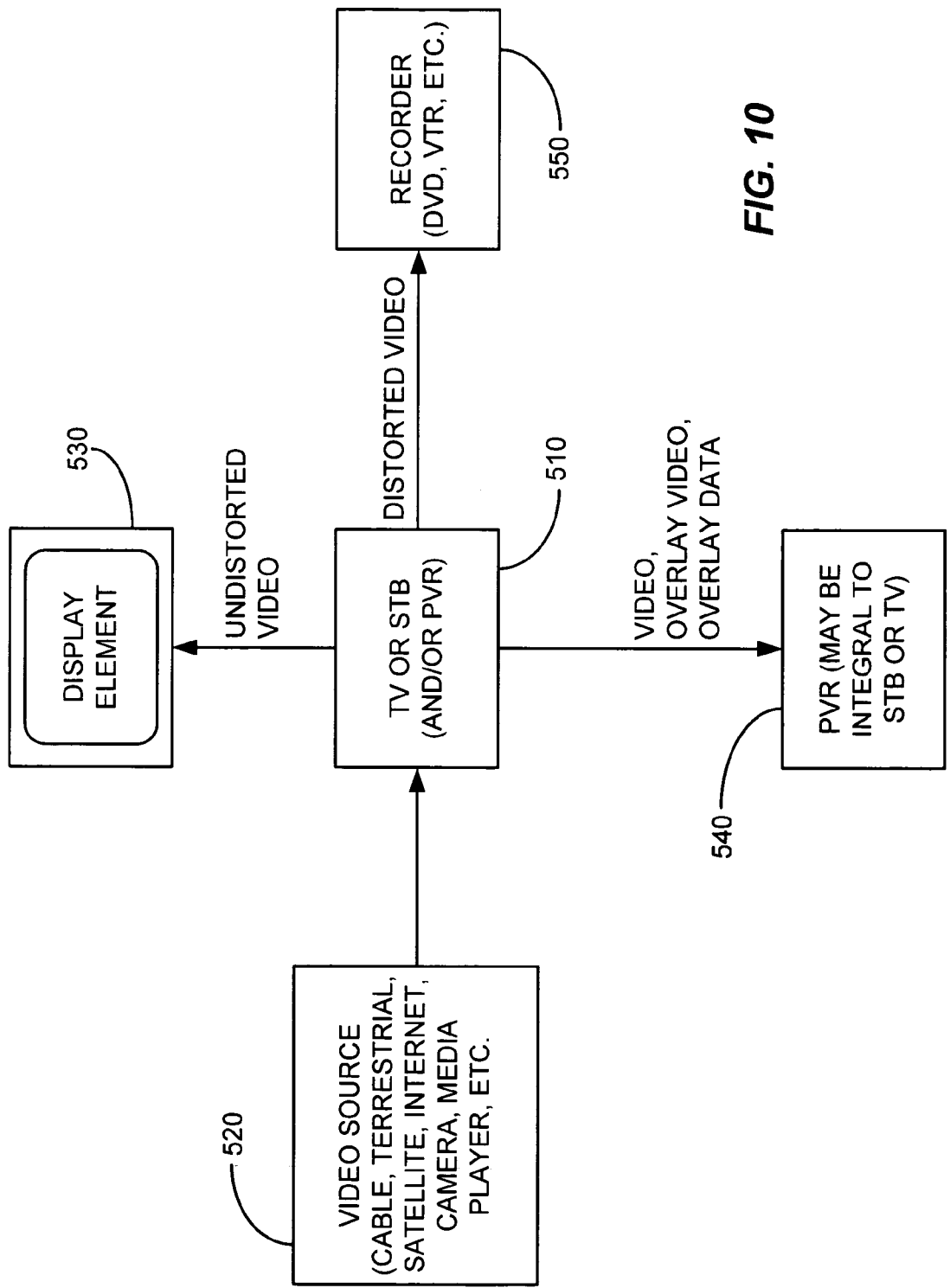
FIG. 10 is an exemplary system consistent with certain embodiments of the present invention.

FIG. 10 shows one embodiment of the equipment used in connection with the present invention. FIG. 10 shows a television STB 510 or television set, and one or more of a multitude of input sources such as satellite, terrestrial, cable, and home wireless to receive the multimedia presentation 520. The STB or television or PVR 510 accepts and processes the multimedia presentation and passes the result to a display element (which may be a television set if 510 is a STB) 530. As an example, the STB 510 uses MPEG 2 video decoders to render the video overlay content in the video overlay plane which overlays the video plane. These decoders vary in sophistication in the number of video planes available. In certain preferred embodiments, the video and audio decoders may be implemented together on a single chip. They may also be incorporated in other ways such as having an intermediate IC used to decode the desired analog signal formats of NTSC, PAL etc. In another embodiment consistent with the present invention, however, the internal electronics of the television set 510 are included in the requisite front end equipment for receiving and decoding the input sources and display element 530 represents the picture tube and associated circuitry (or equivalently, LCDs, etc.).

The digital transport stream DTS is provided to the STB or television 510 from video source 520. Included in the DTS are the meta-data, electronic program guides, overlay content, television channel etc. The STB or television 510 receives the input from the DTS and extracts the censored video and video overlay content therefrom.

The output video to a recorder such as 550 (e.g., VCR or DVD recorder) does not include the contents of the video overlay plane. Since the original video contains marred content (noise, black, patterns, etc), when recording the video content to a VCR or DVD system, it will only receive the contents of the video plane and thus generate a marred copy unsuitable for resale or rebroadcast. Thus, the pirate is inhibited from being able to readily utilize the digital content.

The overlay pixels shown in the video overlay plane can be sent in an encrypted side channel. If an attempt is made to record the original content on a digital receiver system that is not enabled for use of the current embodiment they will not have access to the side channel data and will only be able to record the marred content. Moreover, when the overlay content is encrypted, decryption of the content would be only be a first step in trying to reconstruct a video image suitable for pirating. The entire process of merging the two video planes using the alpha plane would also have to be reconstructed.

Also, audio content can be inserted by a set top box audio decoder or a set top box processor and using frame synchronizing information, the audio content can be replaced with the associated frames.

The Meta-data used for synchronizing the video plane with the video overlay content can be recorded to a hard drive for personal video recording along with the video content at PVR (Personal Video Recorder) 540, which is preferably integral with STB or TV 510. However, it is contemplated that, by use of secure communication, an external PVR or storage device could also be utilized. When the video content is replayed from the hard drive the Meta-data is used as before complete the displayed video. As before, the video may be viewed in it's entirety by the user but the complete video cannot be recorded to a VCR or recordable DVD, etc. 550 which receives only the distorted or censored video portion. Thus, any playback at recorder 550 will contain the distorted or censored portion of the video image without benefit of that portion being overlaid with the overlay video.

The system only allows marred (distorted) content to be recorded on external media while the picture shown on the system main display is shown correctly. The overlays in the overlay video plane cover a larger area than the marring block itself. This hides where pixels next to the marred data are affected during the encoding process.

Thus, in accordance with certain embodiments consistent with the present invention, a video apparatus has a receiver that receives a data stream containing video data and video overlay data, wherein the video data includes a censored region having boundaries. A video plane receives the video data in order to render a video frame for display, the video data including the censored region. A video overlay plane receives the video overlay data in order to render a frame of overlay video data for display. The data in the video overlay plane is a second MPEG video with correct content for the marred areas in the underlying video plane. The alpha plane data has masks sized and positioned to overlay the censored regions in the video plane. The masks in the alpha plane allow the correct video in the overlay video plane to replace the marred areas in the underlying video plane.

Figure 11A:
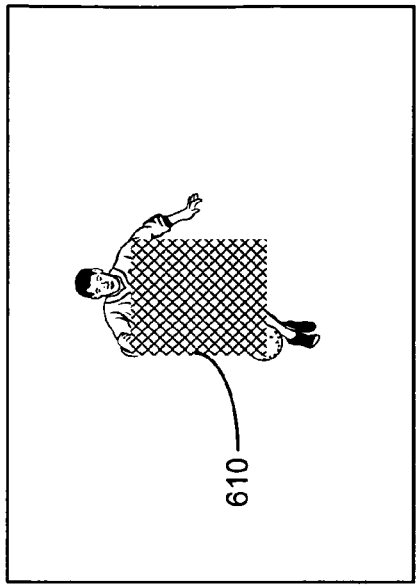
FIG. 11, which is made up of FIGS. 11A, 11B and 11C, are illustrations of a full video image, video planes and overlay frames consistent with certain embodiments of the present invention.
Figure 11B:
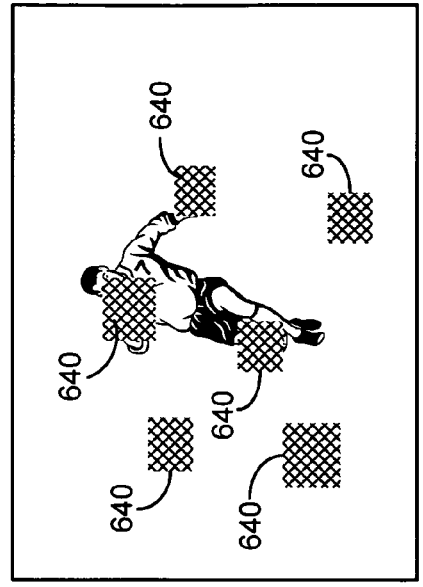
Figure 11C:
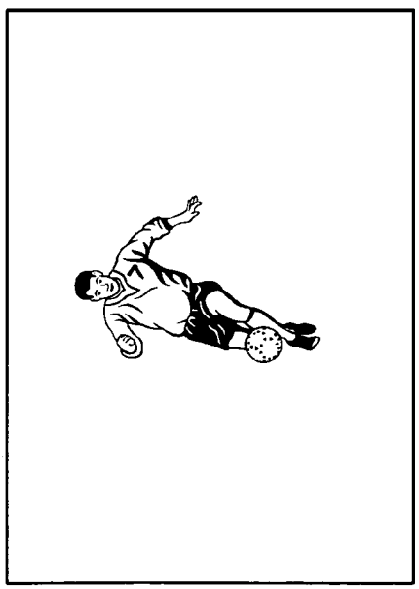

In certain embodiments, it is preferable that a key location in the current scene is chosen in this second method, as depicted in FIGS. 11A through 11C. This key location should preferably be at or near where the viewer's focus would be placed. This redirects the viewer's attention away from the content to the marred areas. In these figures, the size of the marred area is likely exaggerated to illustrate the concept.

Figure 12:
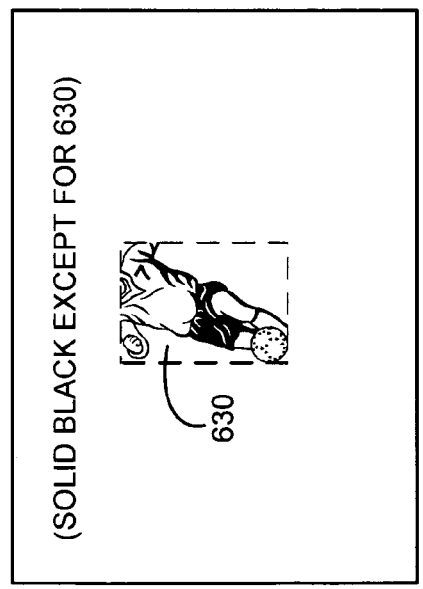
FIG. 12 is an illustration of a video image with multiple marred regions consistent with certain embodiments of the present invention.

In FIG. 11A, the original undistorted image 600 is depicted (or the restored image). If area 610 of FIG. 11B is selected to constitute the area for distortion (reduced by guard band), an unauthorized viewer sees an image resembling that shown in 620. FIG. 11C depicts the contents of the overlay video 630 of overlay video frame 635 shows the area in the video overlay is larger than the marred area. The image 635 is composited over the image 620 using the alpha plane mask (not shown) to recreate image 600. FIG. 12 depicts six regions 640 of the video image that are marred as an illustration that multiple regions can be marred. The marred regions of these examples of FIGS. 11-12 are likely exaggerated and are intended simply to show the concept. It should be noted that the content need not be completely destroyed, but simply use sufficient marring to render it unsuitable, less desirable or undesirable for resale or rebroadcast.

Figure 13:
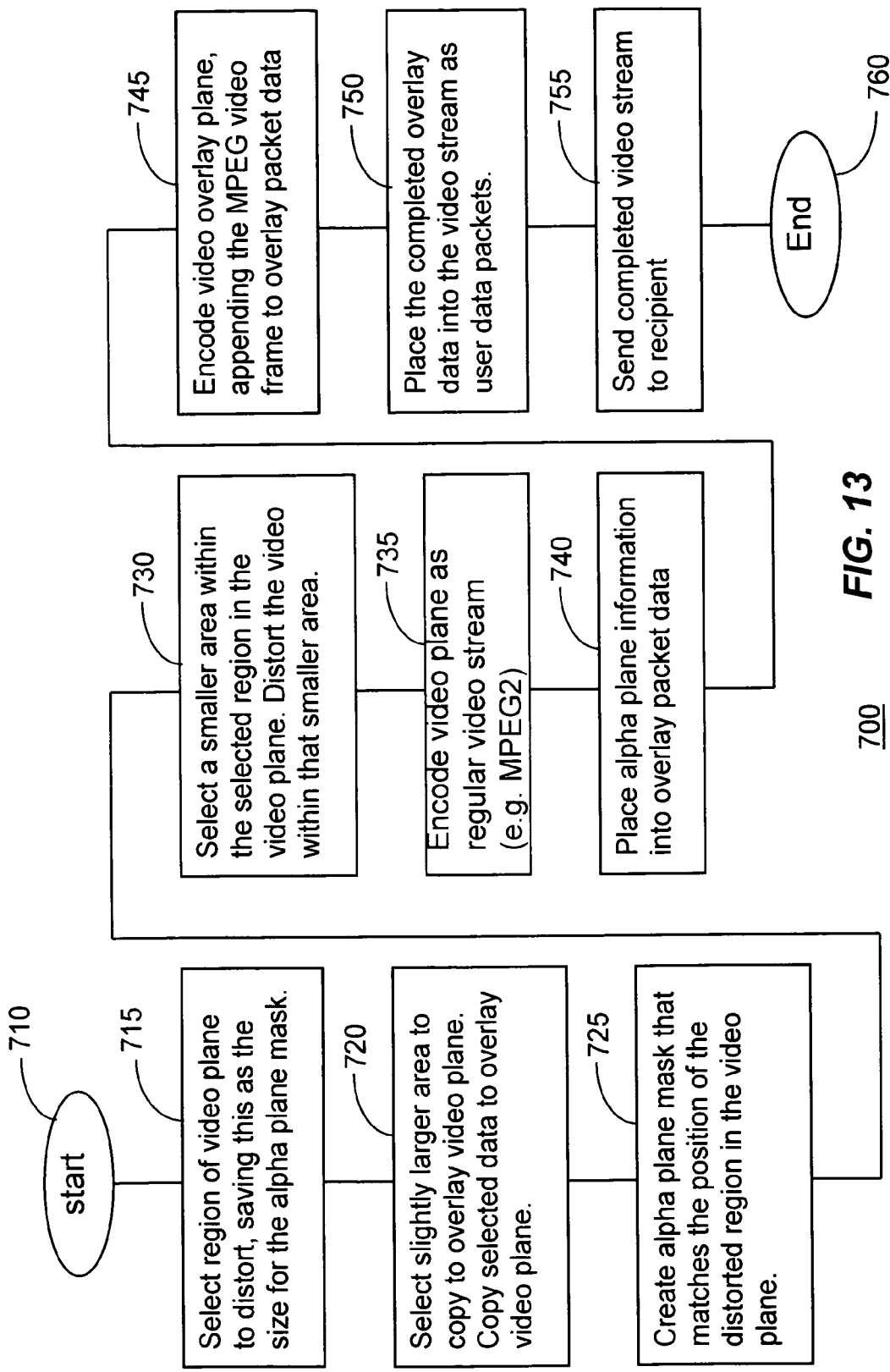
FIG. 13 is a flow chart depicting an exemplary video encoding process consistent with certain embodiments of the present invention.

With reference to FIG. 13, an exemplary process 700 is depicted for processing video for use in accordance with the present embodiment starting at 710. For each video, portion of video or even frame, a region, or regions, of the video image is selected at 715 to determine which area of the video to distort or censor. The selected area(s), for example, could be static or motion vector data and could be selected to obscure areas of significant viewer interest. This size information also sets the size of the alpha plane mask to be used with each area. The size of the region selected is increased by a guard band amount at 720 and then copied to a separate overlay video plane. When a region is selected to distort, an area larger than that selected region is copied to the overlay data and then area smaller than the selected region is distorted. By copying a larger area the overlay guard band is created. The position information of the alpha plane mask(s) is stored at 725. The size of the selected region is then reduced by a guard band at 730 and then distorted censored or otherwise marred. By distorting a smaller area in the original video the guard band in the original video is created. The main video image is then encoded with distorted or censored video in the selected region(s) at 735. The overlay data are generated to identify the location, timing, etc. along with the alpha plane data for the overlay 740 from the previously stored information. The overlay packet data is formatted at 740 as shown in FIG. 6. The video for the overlay video plane is then encoded and appended to the end of the overlay packet data at 745 as shown in FIG. 6. The overlay data is placed into the video stream as user data packets at 750. The completed video stream with overlay data in the user data packets is then sent to the recipient at 755 and the process ends or returns at 760.

Thus, in accordance with certain embodiments consistent with the invention, a video method involves modifying digital video content to produce video data having at least one distorted region; generating overlay video data that, when overlaid on the modified video data covers a region larger than the distorted region with undistorted data; transmitting the modified video data to a recipient; and transmitting the overlay video data and alpha plane data to the recipient.

Figure 14:
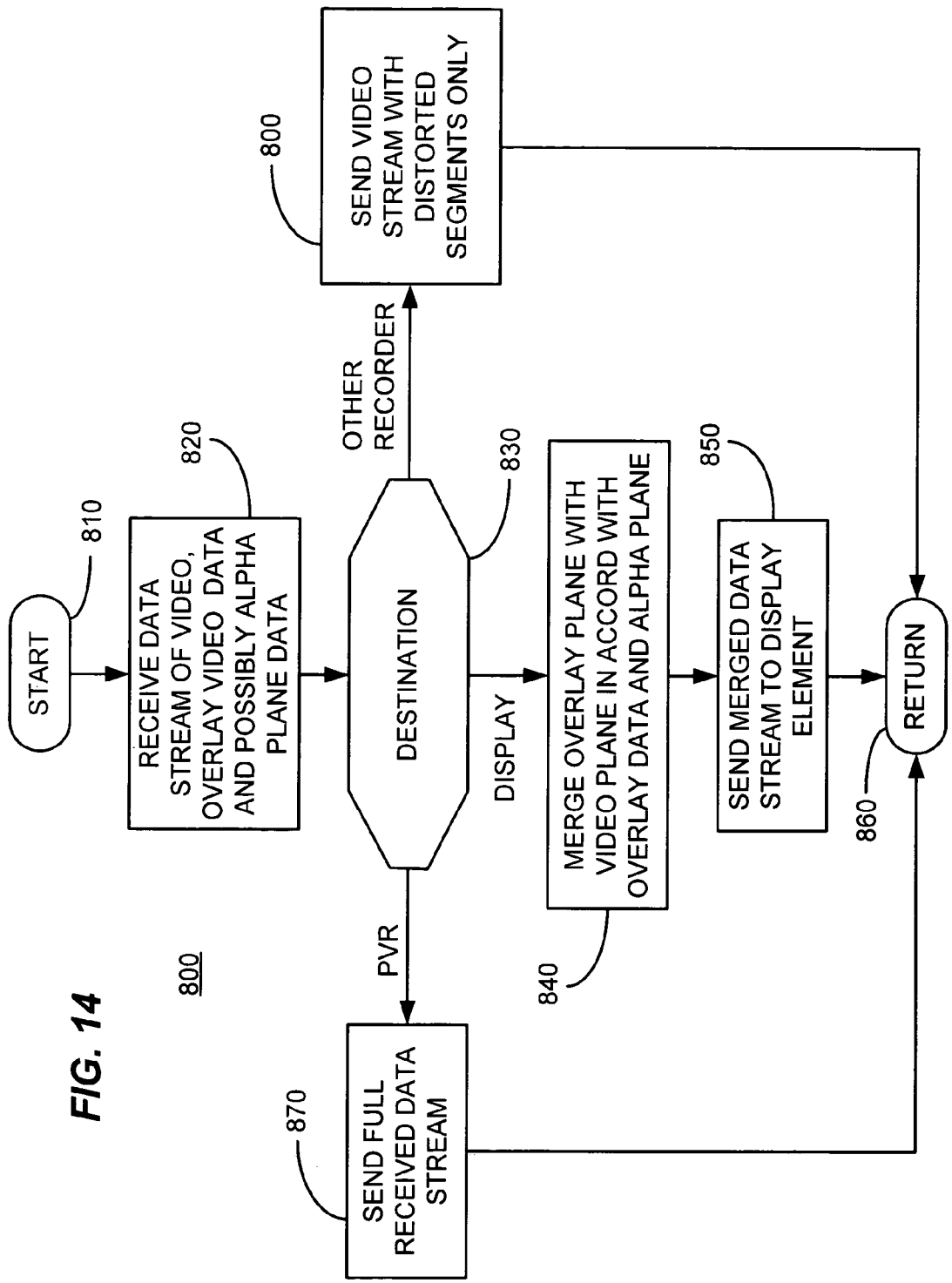
FIG. 14 is a flow chart depicting an exemplary video process used at a recipient device consistent with certain embodiments of the present invention.

With reference to FIG. 14, an example process 800 depicts the flow of information at the recipient end starting at 810. The stream of video data, overlay data and alpha plane data are received at 820 and processed at 830 depending upon the destination for the video. If the video is to be displayed immediately, the overlay plane is merged with the video plane in accordance with the video overlay data and alpha plane data at 840 and the merged information is sent to the display element (e.g., a TV display circuit) at 850. The process then returns at 860. If the image is to be stored to a PVR, the full received data including the overlay data and alpha plane data are sent to the PVR at 870 and the process returns at 860. However, if the image is to be sent to a recorder such as a video cassette recorder or DVD recorder, only the video stream containing distorted or censored data is sent to the recorder at 880 and the process again returns at 860.

Thus, a video method consistent with certain embodiments involves receiving a data stream containing video data and video overlay data, wherein the video data include a censored region having boundaries; sending the video data to a video plane in order to render a video frame for display including the censored region; sending the video overlay data to a video overlay plane in order to render a frame of overlay video data for display; the overlay video data holding the correct video that overlay the censored region; and using an alpha plane that defines overlay boundaries for the overlay data to determine how much of the overlay video overlays the censored region to render the video frame, wherein, the alpha plane defines boundaries that are smaller than the boundaries of the overlay data and larger than the boundaries of the censored region.

In an alternative embodiment, the alpha plane data can be generated from the overlay data by adding or subtracting a specified number of pixels (or a percentage of the size of the overlay, etc.) in all directions to the defined area of the overlay. Other mechanisms can also be devised to calculate a size and location of the alpha plane without departing from embodiments consistent with the present invention.

While the current exemplary system prevents useable recording to a VCR or DVD system, it is compatible with a Personal Video Recorder (PVR) system. For example, for MEPG-2, recording the transport stream data to the PVR hard disc drive (HDD) includes recording the user data channel which contains the overlay data. This will allow the video overlay data to be recreated when the material is played back.

This feature of the current embodiment allows the consumer fair use of the material through PVR recording while preventing the pirating of broadcast content for resale or rebroadcast. All the expected PVR functions such as time shifted recording and personal channels are still supported. The only restriction is that material on the PVR hard disk will produce a marred copy of the protected video content if an attempt is made to record it to a VCR or DVD system, since only the distorted video will be output in such a circumstance.

Embodiments consistent with the present invention can be adapted for use with many digital video formats. Even if a format does not inherently support motion vector information, such as JPEG2000, the first method mentioned can still be employed. Motion vector information can be used by the current embodiment even when it is not part of the chosen digital video format.

In such an environment, first areas in the imagery that are identical between frames are identified and a series of locations are generated for that data across that series of video frames. Those areas can then be replaced with marred content. Once the overlay side channel data has been generated for the all of the digital content the video content can be encoded into the desired format. The overlay data can be applied across a number of video frame replacing the marred content as before.

As before, marring the content would be a pre-processing step just prior to encoding the video. Using this approach, it is possible to use certain embodiments consistent with the present invention with any digital video format. In addition, new methods may be developed that are targeted at specific features of a selected digital video format.

The current overlay system approaches keeping data secure through a layered approach. The overlay video data frames sent in the side channel can be encrypted. The formats used for the frame data can employ multiple frame data header versions where each stores the data in a different order. The format for the pixel data can be varied within the system. The format for the time stamp information can be varied in a sequence or can be tied to the variations in the frame data header. By combining these techniques, the current embodiment system helps to ensure content control.

As mention previously, the contents of the video overlay plane is not included in the video stream sent out to a VCR or DVD recorder. Some hardware systems disallow this operation altogether while other allow control through a register setting. For the purpose of this discussion such register will be referred to as the video overlay control register (VOC register). In some systems this may simply be a field of bits in a register also used for other things.

For devices that use a VOC register setting, a layered approach can be used with redundant safeguards to ensure that the register can never be set to allow the contents of the overlay plane to be included in the video sent out for recording. These safeguards could include at least one of the following three methods or others; 1) removing access to setting this register field through the device driver API, 2) setting the register field to the safe value as an ancillary action on a few selected device driver calls, and 3) periodic check of the register contents for compromise.

By removing easy access to the VOC register through the device driver API access to this register field is restricted to someone with access to the device register specification. This would then suggest a direct write into the targeted field in the VOC register.

For the secondary safeguard, some selected device driver operations that happen at a regular interval could set this register to the safe condition as an ancillary action to their normal duties. Using an MEPG-2 decoder as an example, the register can be set whenever an "I" frame is to be processed, whenever a frame is skipped or whenever a mechanism for recovering from faulty data is invoked.

The third safeguard periodically checks the contents of the VOC register to determine if it has been altered. If the system detects that this register has been altered to send the contents of the video overlay plane to the output port for VCR recording, several action may be taken ranging from halting decode to rebooting the system.

A business method for generating fees using a receiving device in a manner consistent with certain embodiments involves distributing censored video from a distributor video to a receiving device; and uncensoring said censored video using the receiving device upon payment of a fee, said receiving device using overlay data received from said distributor to uncensor said censored video by overlaying the overlay data over the censored video using a video overlay frame to overlay a video frame containing the censored video data in accordance with boundaries determined by an alpha plane within the receiving device. Above variations can be applied to the method to facilitate the uncensoring process.

Given the technology of live system updates and downloadable "field upgrades", the data formats used with embodiments consistent with the present invention can be expanded while maintaining backward compatibility.

Those skilled in the art will recognize, upon consideration of the above teachings, that certain of the above exemplary embodiments are based upon use of a programmed processor, for example forming a portion of the STB. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain embodiments herein were described in conjunction with specific circuitry that carries out the functions described, other embodiments are contemplated in which the circuit functions are carried out using equivalent software or firmware embodiments executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Thus, in accordance with certain embodiments consistent with the present invention, a video data signal, has a segment of video data representing at least one frame of video having at least one region that has been intentionally distorted; and a segment of video overlay data representing video that, when overlaid on the distorted video data covers a region larger than the distorted region with undistorted data.

While certain illustrative embodiments have been described, it is evident that many alternatives, modifications, permutations and variations will become apparent to those skilled in the art in light of the foregoing description.

What is claimed is:

1. A video apparatus, comprising:
   means for receiving a data stream containing video data and video overlay data, wherein the video data includes a censored region having boundaries;
   a video plane receiving the video data in order to render a video frame for display, the video data including the censored region;
   a video overlay plane receiving the video overlay data in order to render a frame of overlay video data for display;
   the overlay data having boundaries that overlay the censored region;
   an alpha plane that defines overlay boundaries for the overlay data to determine how much of the overlay video data overlays the censored region when rendering the video frame by compositing the video plane with the video overlay plane; and
   wherein, the alpha plane defines boundaries that are smaller than the boundaries of the overlay data and larger than the boundaries of the censored region.

2. The video apparatus according to claim 1, wherein the censored region comprises at least one region or more than one region selected from the following: a static portion of the video data, a motion vector portion of the video data, a random block of the video data, a macroblock of video data, or any combination thereof.

3. The video apparatus according to claim 1, further comprising means for storing the video data having the censored region.

4. The video apparatus according to claim 1, further comprising:
   a video recorder;
   wherein the video recorder comprises either a video tape recorder or a DVD recorder or on both; and
   wherein the video data including the censored region are stored on the video recorder.

5. The video apparatus according to claim 1, further comprising:
   a personal video recorder; and
   wherein the video data including the censored region, and the overlay data are stored on the personal video recorder.

6. The video apparatus according to claim 5, wherein data defining the alpha plane are stored on the personal video recorder.

7. The video apparatus according to claim 1, embodied in one of a television, a television set top box, or a personal video recorder.

8. A video method, comprising:
   receiving a data stream containing video data and video overlay data, wherein the video data include a censored region having boundaries;
   sending the video data to a video plane in order to render a video frame for display including the censored region;
   sending the video overlay data to a video overlay plane in order to render a frame of overlay video data for display;
   the overlay video data having boundaries that overlay the censored region; and
   using an alpha plane that defines overlay boundaries for the overlay data to determine how much of the overlay video data overlays the censored region to render the video frame, wherein, the alpha plane defines boundaries that are smaller than the boundaries of the overlay data and larger than the boundaries of the censored region.

9. The video method according to claim 8, wherein the censored region comprises at least one region or more than one region selected from the following: a static portion of the video data, a motion vector portion of the video data, a random block of the video data, a macroblock of video data, or any combination thereof.

10. The video method according to claim 8, further comprising storing the video data having the censored region.

11. The video method according to claim 10, wherein the video data, including the censored region, are stored on either a video tape recorder or a DVD recorder or on both.

12. The video method according to claim 8, wherein the video data including the censored region and the overlay data are stored on a personal video recorder.

13. The video method according to claim 12, wherein data defining the alpha plane are stored on the personal video recorder.

14. The method according to claim 8, further comprising compositing the video data with the video overlay data in accordance with the boundaries defined by the alpha plane.

15. The method according to claim 8, further comprising receiving data defining the alpha plane.

16. The method according to claim 8, further comprising generating the alpha plane from received video overlay data.

17. The method according to claim 8, further comprising decrypting the overlay video data.

18. The method according to claim 8, carried out in at least one of a television, a television set top box, or a personal video recorder.

19. A computer readable storage medium storing instructions which, when executed on a programmed processor, carry out a video method according to claim 8.

20. A video method, comprising:
modifying digital video content to produce video data having at least one distorted region;
generating overlay video data that, when overlaid on the modified video data covers a region larger than the distorted region with undistorted data;
transmitting the modified video data to a recipient; and
transmitting the overlay video data to the recipient.

21. The method according to claim 20, further comprising generating alpha plane data that defines boundaries smaller than boundaries of the overlay video data for generating a composite image from the modified video data and the overlay video data, that produces a video image that corresponds to the digital video content.

22. The method according to claim 21, further comprising transmitting the alpha plane data to the recipient.

23. The video method according to claim 20, wherein the distorted region comprises at least one region or more than one region selected from the following: a static portion of the video data, a motion vector portion of the video data, a random block of the video data, a macroblock of video data, or any combination thereof.

24. The method according to claim 20, wherein the overlay video data are transmitted in an MPEG user data channel.

25. The method according to claim 20, wherein the overlay video data are transmitted during available times in a fixed bandwidth video channel.

26. The method according to claim 20 wherein the overlay video data for a particular video frame are transmitted in advance of video data for the particular video frame.

27. The method according to claim 20, further comprising encrypting the overlay video data before it is transmitted.

28. A computer readable storage medium storing instructions which, when executed on a programmed processor, carry out a video method according to claim 20.

* * * * *

UNITED STATES PATENT AND TRADEMARK OFFICE
CERTIFICATE OF CORRECTION

PATENT NO. : 7,319,469 B2 Page 1 of 1
APPLICATION NO. : 10/898757
DATED : January 15, 2008
INVENTOR(S) : Dawson It is certified that error appears in the above-identified patent and that said Letters Patent is hereby corrected as shown below:

In col. 1, line 33, delete "stem" and insert --stern-- therefor.

Signed and Sealed this

Sixth Day of May, 2008

JON W. DUDAS
*Director of the United States Patent and Trademark Office*